US 8,458,066 B2

(12) United States Patent
Abernethy et al.

(10) Patent No.: US 8,458,066 B2
(45) Date of Patent: Jun. 4, 2013

(54) METHOD AND SYSTEM TO RE-CREATE LOST CASH LETTERS

(75) Inventors: George M. Abernethy, Charlotte, NC (US); Douglas P. Hutchinson, Fayetteville, GA (US); Carmen McClendon, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 983 days.

(21) Appl. No.: 12/024,244

(22) Filed: Feb. 1, 2008

(65) Prior Publication Data
US 2008/0189126 A1 Aug. 7, 2008

Related U.S. Application Data

(60) Provisional application No. 60/887,899, filed on Feb. 2, 2007.

(51) Int. Cl.
*G06Q 40/00* (2012.01)
*G06F 11/14* (2006.01)
*G06Q 10/10* (2006.01)
*G06F 11/07* (2006.01)

(52) U.S. Cl.
CPC ............ *G06Q 40/00* (2013.01); *G06Q 10/10* (2013.01); *G06F 11/1469* (2013.01); *G06F 11/0748* (2013.01); *G06F 11/0793* (2013.01)
USPC .............................................. 705/35; 705/45

(58) Field of Classification Search
CPC ........ G06Q 40/00; G06Q 10/10; G06F 11/469; G06F 11/0748; G06F 11/0793
USPC ........................................................ 705/35, 45
See application file for complete search history.

(56) References Cited

U.S. PATENT DOCUMENTS

| 5,237,159 | A | * | 8/1993 | Stephens et al. ................. 705/30 |
| 5,412,190 | A | * | 5/1995 | Josephson et al. ............... 705/45 |
| 5,784,610 | A | | 7/1998 | Copeland, III et al. |
| 7,720,313 | B2 | * | 5/2010 | Franklin et al. ............... 382/305 |
| 2004/0049773 | A1 | | 3/2004 | Yotsukura |
| 2005/0033685 | A1 | * | 2/2005 | Reyes ............................. 705/39 |

(Continued)

OTHER PUBLICATIONS

Continuity in check image and lockbox processing. (2000). Today, 22(3), 44-46. Retrieved Apr. 8, 2013.*

(Continued)

*Primary Examiner* — Kito R Robinson
(74) *Attorney, Agent, or Firm* — Michael A. Springs; Moore & Van Allen PLLC; Jeffrey R. Gray

(57) ABSTRACT

A method and system to re-create lost cash letters are disclosed. Embodiments of the invention can be used to re-create a paper-based cash letter or an electronic cash letter file that is inadvertently lost due a system failure, theft, natural disaster, or the like. The items represented in the cash letter are identified and a file corresponding to a data set describing the plurality of items is created. Images representing the plurality of items are stored within a recovery check image management system (CIMS). The file corresponding to the data set can then be reformatted using the images in order to re-create the cash letter. Finally, the cash letter can be presented with at least one of an image and an image replacement document (IRD) for each item of the plurality of items in the recovery CIMS.

19 Claims, 5 Drawing Sheets

U.S. PATENT DOCUMENTS

| | | | |
|---|---|---|---|
| 2005/0171899 A1* | 8/2005 | Dunn et al. | 705/39 |
| 2006/0106717 A1 | 5/2006 | Randle et al. | |
| 2006/0118613 A1* | 6/2006 | McMann et al. | 235/379 |
| 2008/0000962 A1* | 1/2008 | Cantley et al. | 235/379 |

OTHER PUBLICATIONS

Bank of America Corporation, PCT International Search Report, issued in corresponding International Patent Application No. PCT/US08/52807, Nov. 3, 2008.

Bank of America Corporation, PCT Written Opinion, issued in corresponding International Patent Application No. PCT/US08/52807, Nov. 3, 2008.

International Preliminary Report on Patentability for International Application No. PCT/US2008/052807 mailed Aug. 13, 2009.

* cited by examiner

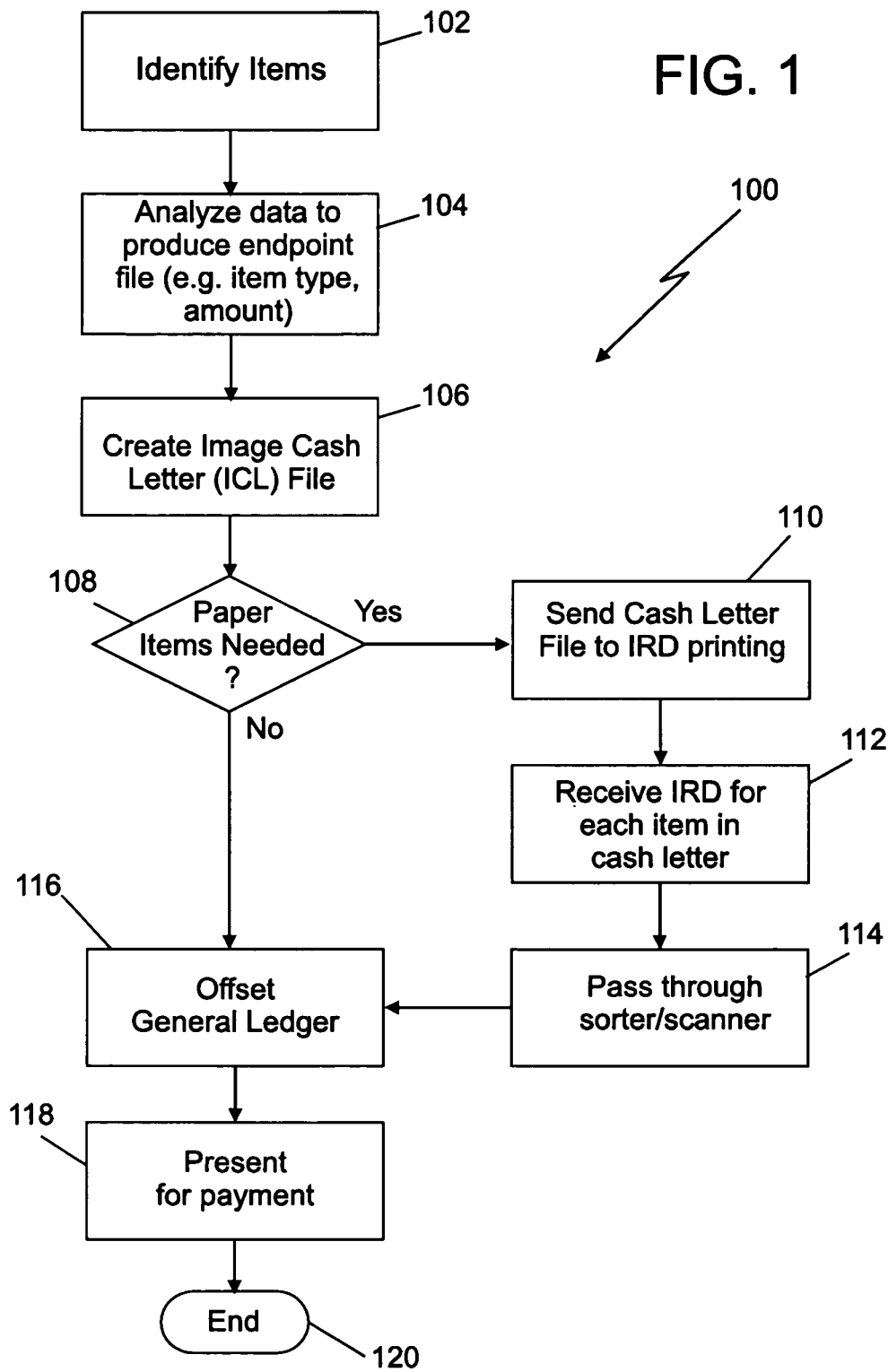

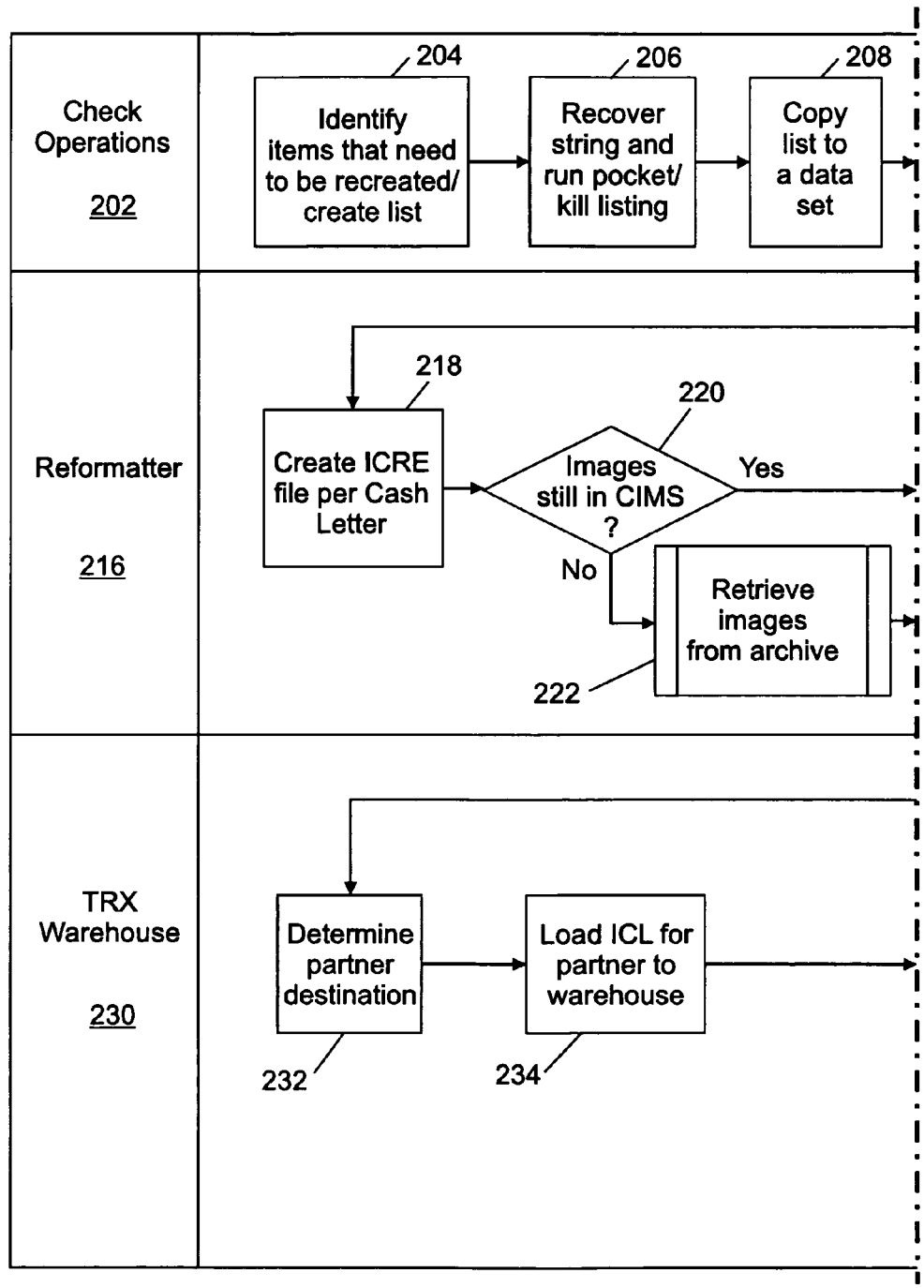

METHOD AND SYSTEM TO RE-CREATE LOST CASH LETTERS

CROSS-REFERENCE TO RELATED APPLICATION

This application claims priority form co-pending, commonly owned provisional patent application Ser. No. 60/887,899, filed Feb. 2, 2007, the entire disclosure of which is hereby incorporated herein by reference.

BACKGROUND

Financial Institutions have established various processes and associations related to the exchange of documents evidencing monetary transactions. Some types of documents have been historically encoded with magnetic ink so that information from the documents can be read by machine. Such documents have thus become known as magnetic ink character recognition (MICR) documents. Historically, these documents have been at least theoretically presented by delivery of physical paper. However, many types of payments and transactions are no longer enabled by paper. Additionally, even with traditional checks, check presentment and clearing is no longer accomplished using the physical checks, even though paper checks may be still be shipped between banks.

For some time, posting of financial transactions to accounts at a clearing institution has been accomplished through the use of a "cash letter" which contains detailed data on all the transactions to be cleared. At one time, cash letters were paper documents, but in the modern banking system, an "electronic cash letter" (ECL) is typically used. An ECL file can also be referred to as an "electronic cash presentment" (ECP) file. ECP files are formatted according to accepted industry standards. ECP files can be sent directly between financial institutions, but they are also often sent through clearing agents or a centralized, government based banking system, for example, the Federal Reserve System in the United States. Reconciliation and error recovery based on paper documents is subject to numerous exceptions as a result of paper handling and due to late delivery of documents. Thus, legislation has been promulgated which has allows banks to completely eliminate paper documents and accomplish reconciliation and other processes using electronic images of checks and other documents. In some cases, an "image replacement document" (IRD) can be used as a substitute for an image. An IRD file is also formatted according to accepted industry standards.

SUMMARY

If a paper cash letter shipment is lost, the paper cash letter shipment must be re-created. The image based infrastructure that has been established to provide for the transition to electronic, image-based processing can be used to aid in a re-creation process carried out according to embodiments of the present invention. Embodiments of the invention can also be used to re-create an electronic cash letter file that is inadvertently erased or lost due a system failure, natural disaster, or the like.

According to example embodiments, a method of re-creating a lost cash letter from otherwise stored information regarding a plurality of items represented in the cash letter includes identifying the plurality of items represented in the cash letter, and creating a file corresponding to a data set describing the plurality of items. Images representing the plurality of items are then stored within a recovery check image management system (CIMS). The file corresponding to the data set can then be reformatted using the images in order to re-create the cash letter. Finally, the cash letter can be presented with at least one of an image and an image replacement document (IRD) for each item of the plurality of items in the recovery CIMS, depending on whether the institution to which presentment must be made is completely image enabled.

In some embodiments, the file corresponding to the data set is a standard input creation (ICRE) file. In some embodiments, when image replacement documents are needed, they are printed using the information stored in the check-processing environment and then re-captured to create images in the system to be used in a cash letter file that includes check images. Provisions can be made for retrieving actual images from a storage archive if they are no longer present in the check-processing environment, such as in the CIMS used for day-to-day operations.

An instruction execution system for re-creating cash letters from otherwise stored information in example embodiments can be the same mainframe computer system used to maintain operable to maintain a check processing environment. Such a system can include a check processing control system (CPCS) to enable identifying the plurality of items represented in the cash letter and to create the file corresponding to a data set describing the plurality of items. The mainframe based system can also include at least one check image management system (CIMS) to store images corresponding to the plurality of items, and a re-formatter functionally connected to the CPCS and the CIMS to reformat the file corresponding to the data set using the images to re-create the cash letter.

In some embodiments, there are two CIMS, one for day-to-day operations, and another for recovery operations. In some embodiments, the mainframe-based system also includes a transaction exchange (TRX) warehouse to manage presenting the cash letter. Connectivity to a check archive system can also be included. A computer program product including computer program code instructions to operate the mainframe-based system can form a portion of the means to carry out an embodiment of the invention.

BRIEF DESCRIPTION OF THE DRAWINGS

FIG. 1 is a high-level flowchart illustrating a method according to example embodiments of the invention.

FIGS. 2A, 2B and 3 are detailed flowcharts illustrating methods according to example embodiments of the invention.

DETAILED DESCRIPTION OF THE INVENTION

Figure 2B:
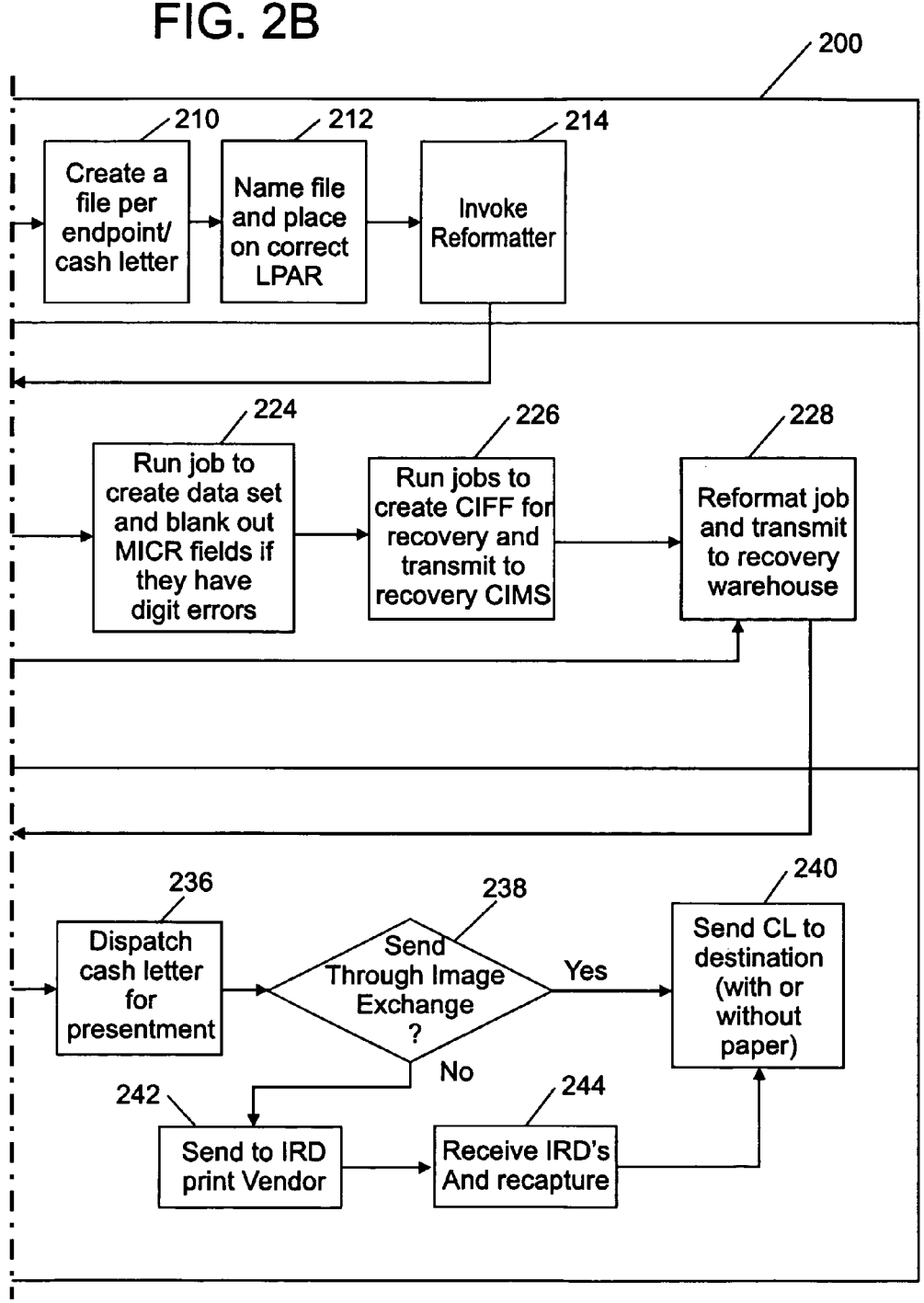

The following detailed description of embodiments refers to the accompanying drawings, which illustrate specific embodiments of the invention. Other embodiments having different structures and operation do not depart from the scope of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-readable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

Although the system in use in a typical check processing environment is well-known to those of skill in the financial computing arts, some of the system components will now be reviewed and discussed and some of the terms used herein will be explained for convenience. In some embodiments of the invention, a transaction exchange (TRX) warehouse is used. The transaction exchange warehouse might also be called simply a "transaction exchange" or the "TRX" and can take the form of a data warehouse with processing and storage capabilities necessary to sweep the appropriate cash letter data into files as needed. The use of a TRX warehouse to consolidate cash letter data is described in U.S. Pat. No. 7,275,684, issued Oct. 2, 2007, which is incorporated herein by reference. In at least some embodiments, an image archive is also functionally connected within the system to enable appending images to files. The image archive can be a single archive, or multiple archives such as a long term and short term archive.

In the example embodiments discussed herein, the TRX is a data repository that can be used as a processing platform to provide external applications with the ability to store, count, extract, and process data and images related to transactions. The transaction exchange warehouse can collect data in increments and distribute it as needed. The TRX receives transaction information from upstream systems, stores the transactions within a common repository, and distributes transaction information. In example embodiments, the TRX is implemented by a computer platform with high availability and reliability. Such platforms are known in the art and can be based on many different types of operating systems. A TRX system might include an input stage which receives cash letter data from various sources. The TRX might also include software to format cash letter data for storage and indexing. A TRX might also include an output stage to format data from the TRX core storage systems to be output for various systems.

The term "bank" and any similar terms are used herein in their broadest sense. Financial institutions that process transactions and documents of the types discussed can include stock brokerages, credit unions, and other types of institutions which are not strictly banks in the historical sense. Even retail and other service businesses, as well as manufacturers may process documents and/or data as disclosed herein. The use of terms such as bank, "institution" or "franchise" herein is meant to encompass all such possibilities.

Much of the terminology herein refers to the processing of information about MICR encoded documents. This information can be stored in a data processing system, in computer memory and/or media for retrieval and manipulation. There are many ways to design a system to accommodate the storage of this information, as well as the storage of electronic images of documents such as checks. For example, this terminology can refer to information stored in what is commonly known as a "check image management system" (CIMS) and within a "check processing control system" (CPCS). A CPCS can sometimes simply be referred to as a "check operations system" or simply "check operations." Such systems are well known within the banking industry by those who work in the financial data processing fields. Such data processing systems have historically been produced by the International Business Machines (IBM) Corporation. CIMS has been more recently produced and marketed by Carreker Corporation of Dallas, Tex., U.S.A. Carreker and their products are well-known throughout the financial services industry. It should be noted that for purposes of implementing an embodiment of the present invention, system such as this can be set up specifically for use in recovery operations. Such systems might be referred to as a "recovery" system as in "recovery CIMS," "recovery TRX," "recovery warehouse" and the like.

Check images and data about the checks the images represent, such as index information referring to the check images, which typically includes the MICR data, can be stored by processing systems according to any of various industry standard formats, for example, the well-known common import file format (CIFF). Such systems have been used for many years by many banks to store check images. Images and index information in such a system can be stored in the same file or separated. In some environments, the index information is separated and stored in an electronic cash letter (ECL) for communicating between financial institutions for the purpose of settlement.

Index information can also be stored with electronic images in an "image cash letter" (ICL) to provide for the truncation of the paper documents. Again, these systems and techniques are well known by those of ordinary skill in the financial information technology arts. A well-known industry standard format for a cash letter file that contains both images and all data necessary to index and understand the images is the X9.37i format, which is promulgated by the American National Standards Institute (ANSI).

An IRD is paper document created by a bank to use as a substitute for a paper check for presentment to a drawee bank. Such a document might be needed if the drawee bank is not image enabled. Since, as previously discussed, legislation has authorized banks to do away with the use of paper for settlement and reconciliation of accounts between banks; it is possible that a depositary bank would not keep a copy of a check for presentment. In cases where a paper document is needed, the legislation authorizes a bank to create one in the form of a "substitute check." A substitute check contains an image of the front and back of the original check, as well as a MICR line that can be read by standard MICR equipment. Since the substitute check uses a printout of a stored electronic image, it is often referred to in banking parlance as an image replacement document ("IRD"). The IRD normally carries with it the full faith and credit formerly attributed to paper checks, as long as it meets the standards specified in the legislation. In example embodiments of the invention, IRD's are in some cases run back through the implementing bank's capture systems as part of the process of re-creating a lost cash letter shipment.

FIG. 1 is a flowchart that illustrates a process, 100, according to example embodiments of the invention at a high level. Like most flowcharts, FIG. 1 illustrates the process as a series of process or subprocess blocks. In FIG. 1, items to be replaced due to a lost cash letter shipment are identified at block 102. The data regarding these items is then analyzed at block 104. This analysis includes generating a file of cash letter items, restoring images from either long or short-term archive storage or both, creating a CIFF file of the items to be eventually included in the recovered cash letter(s), storing those items in CIMS, and generating a detailed file that provides all of the information that can be used in the recovery cash letter system to generate an appropriate replacement cash letter shipment. Once this analysis is complete, an image cash letter (ICL) file is created at block 106. In some embodiments, the ICL file can be an X9.37 file that is generated by formatting software.

Still referring to FIG. 1, in this embodiment a determination is made at block 108 as to whether paper items are needed for the particular institution or clearing house that is to receive the cash letter. If so, a cash letter file in the form of an image replacement document (IRD) print file is prepared for and sent to a print vendor at block 110. In such a case, image replacement documents are received from the vendor at block 112 and recaptured on bank machines at block 114. These may be the same machines normally used to capture checks, such as standard check sorter/scanner machines. The general ledger accounts are offset appropriately as is understood in the art at block 116, regardless of whether paper is needed as determined at block 108. Finally, the replacement cash letter shipment is presented at block 118. Presentment may be made via a central clearing authority, in the United States for example, the Federal Reserve System. Process 100 ends at block 120.

FIGS. 2A and 2B show a more detailed flowchart of a process according to embodiments of the present invention. Process 200 of FIGS. 2A and 2B is presented as a so called "swim lanes" diagram, in which portions of the process performed by check operations, reformatting software, or the "reformatter," and a TRX warehouse are illustrated in "swim lanes" corresponding to the appropriate components of a check processing environment. Beginning with the check operations swim lane, 202, items that need to be included in a re-created cash letter are identified at block 204 and put in a list. In order to identify the appropriate items, standard reports, for example those from a CPCS, can be used. Items can be identified at the item level or by endpoint. Items can be identified according to sequence number and MICR data, or using standard CPCS strings. An endpoint is a specific place to which a file is sent for presentment, reconciliation, posting, or the like. In most cases an endpoint corresponds to a clearing financial institution. A file of cash letter data that is sent to such an institution can be referred to an "endpoint" file.

Still referring to FIGS. 2A and 2B, at block 206, CPCS strings for any items identified via other means are determined, and a kill listing for the items to be included in a re-created cash letter is produced. A kill listing is a listing of items from a particular entry run on a particular sorter. Items will be listed for individual pockets of the sorter since often a specific pocket will correspond to an endpoint in that all of the work for that pocket is destined for a particular place. The kill listing can be run on that pocket for a particular CPCS string and a particular entry, or a kill listing can cover multiple pockets. Substrings in CPCS, such as an I-string or a D-string, can be determined from the kill listing.

At block 208 of FIGS. 2A and 2B, the kill listing is copied to a data set. Typically, tools which are designed to produce kill listings in a check processing environment are intended to produce paper listings. A printed listing can be forced to an electronic file as is known in the art. This electronic file can be referred to as a data set. At block 210, the data set is reorganized into one file per each endpoint or cash letter, assuming the data set covered more than one endpoint to begin with. If not, block 210 consists of putting the data set into cash letter format. Breaking the information down by endpoints makes it easier to produce cash letter reports. At block 212, the file corresponding to the data set made from the kill listing is deposited in an appropriate logical partition (LPAR) in the check processing environment. Logical partitions are discussed in more detail with respect to FIG. 4. The reformatter is evoked at block 214.

Continuing with FIGS. 2A and 2B, reformatting software, also known as "reformatter" 216 is executed on the files previously deposited in the appropriate logical partition. At block 218, an input creation ("ICRE") file is created for the cash letter. The ICRE format is a standard file format used in check processing environments, and is well known in the art. ICRE files can be used to extract images from a check image management system (CIMS) or from an archive. An ICRE file contains detailed information for items which get captured on a sorter or sorters. For example, the ICRE file would typically contain information on a batch of items that was run, statistics about those items, and the MICR line information for the items. At block 220, a determination is made as to whether images corresponding to the items in the cash letter being re-created are still stored in the main CIMS. If not, the images are retrieved from the archive at block 222. Details of this retrieval process are discussed with respect to FIG. 3. If the images are still present in the CIMS, software is run at block 224 to create a data set to extract the appropriate images from the CIMS. This software also blanks out any MICR fields that have digit errors. In a typical check processing environment, these errors have been recorded with appropriate strings in the CPCS. At block, 226 a software job is run to create a CIFF file for the checks retrieved from CIMS for the cash letter that is to be re-created. These image files are then transmitted to a separate CIMS set up specifically for cash letter re-creation, called a "recovery" CIMS. At block 228, the reformatter uses the item images to reformat the ICRE file corresponding to the original data set into a re-created cash letter file. This re-created cash letter is then forwarded to the TRX warehouse for eventual presentment.

Staying with FIGS. 2a and 2B, TRX warehouse 230 determines a destination for the recreated cash letter at block 232. The destination is typically a clearing partner or another financial institution. At this point, the reformatter has essentially formatted all of the needed information for a standard daily process executed by the TRX warehouse for cash letter operations. It should be noted that this TRX warehouse could be the same TRX warehouse that is used for day-to-day operation, or a special recovery TRX warehouse could be set up to handle re-created cash letters only. At block 234 an image cash letter (ICL) file is loaded into the appropriate storage space for the partner to whom the cash letter is destined. At block 236, the re-created cash letter is dispatched to the appropriate LPAR to be transmitted for presentment. At block 238 of FIGS. 2A and 2B, a determination is made as to whether the particular partner involved in the transaction requires paper items, or is image enabled. If the partner is normally dealt with exclusively by image exchange, the cash letter file is sent over the network to the partner at block 240 and the process ends. If the partner requires paper items, the file is sent to an image replacement document print vendor at block 242. Image replacement documents are then received and recaptured at bock 244. A cash letter file is still dispatched at block 240 as before, and the process ends.

Figure 3:
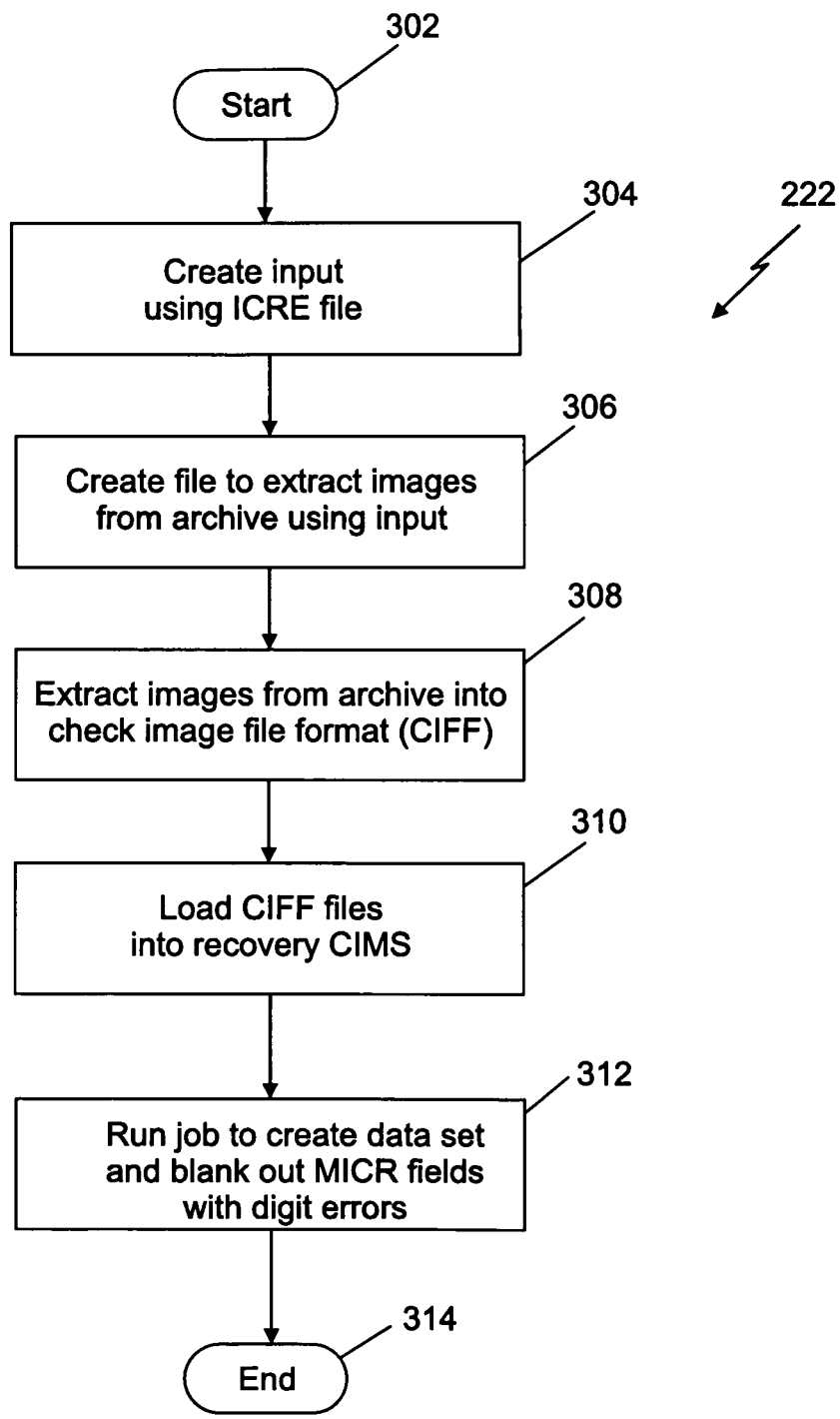

FIG. 3 provides additional detail for sub-process 222 of FIGS. 2A and 2B. Process 222 is used when images need to be retrieved from a storage archive. Such a storage archive is often maintained by a third party vendor to financial institutions. Process 222 begins at block 302. At block 304, the ICRE file is reformatted into an input file to extract images from the archive. Such an input file is often referred to as an "auxiliary" or "aux" file. At block 306, the aux file is converted into a sender policy framework (SPF) file and forwarded to the archive system. Both the aux file and the SPF file are known file types used for check image exchange ("CIEX"). These are standard files which contain the account number, dollar amounts, MICR information, and CIMS keys as is known in the art. The archive system will create a script according to the national data set maintenance (NDM) standard to retrieve the appropriate items from storage.

Still referring to FIG. 3, images are extracted from archival storage into one or more CIFF files at block 308. The images are then sent back to the check processing environment using an NDM file transfer. At block 310 of FIG. 3, the CIFF files are loaded into the recovery CIMS as before. At block 312, a software job is run to create the data set in which MICR fields that have digit errors are blanked out as previously discussed. Subprocess 222 ends at block 314.

Figure 4:
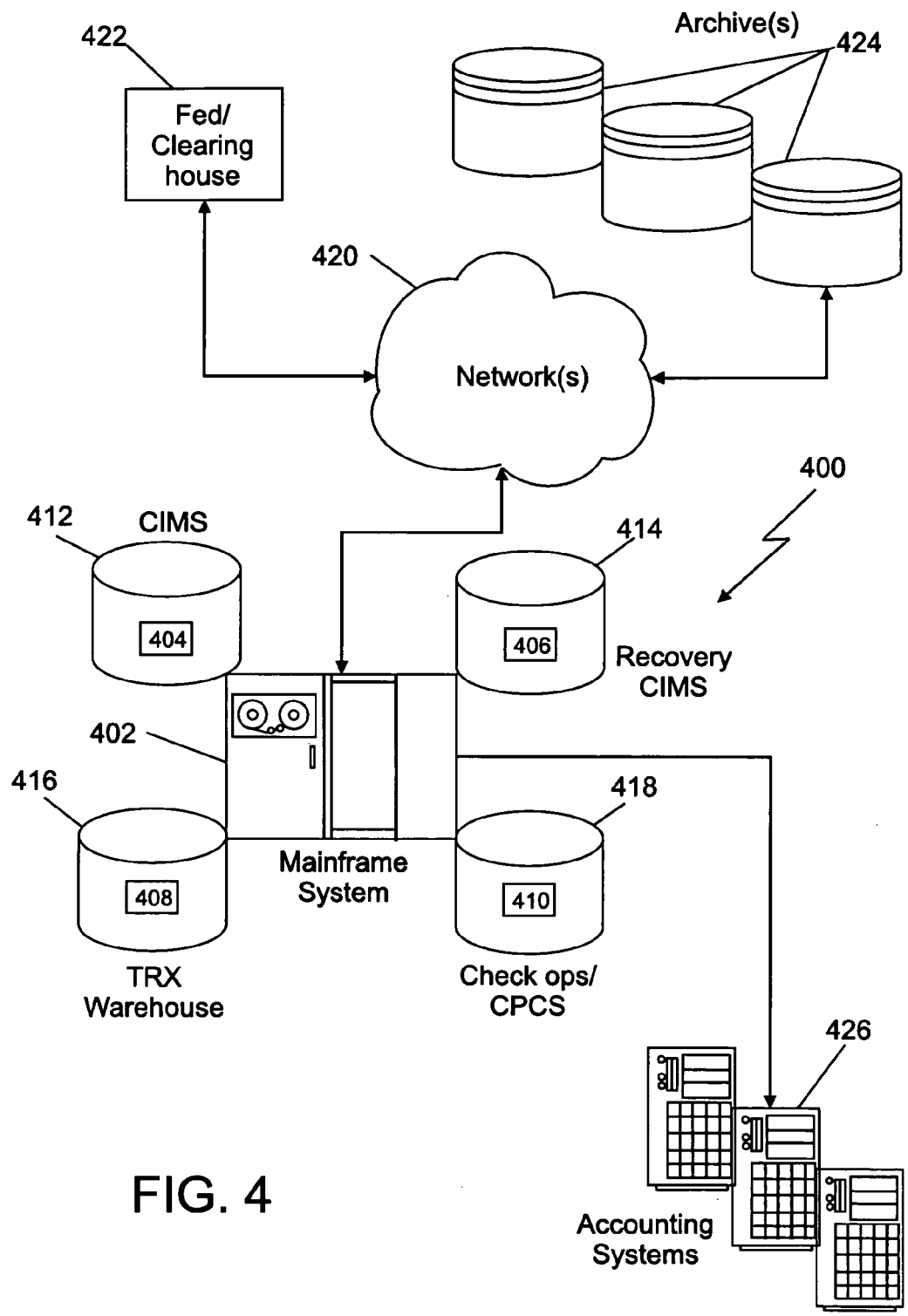
FIG. 4 is an example system block diagram illustrating the operating environment and a system according to example embodiments of the invention.

FIG. 4 shows a system block diagram according to example embodiments of the invention. In this example, check processing environment 400 includes mainframe computer 402, which serves as an instruction execution platform. Like most computer systems, the mainframe system includes fixed storage media. Such fixed storage media, as well as other resources in the mainframe system, might be divided into various logical partitions (LPAR's), for storing programs and/or data which enable the various systems that make up the check processing environment controlled by the mainframe computer system. These programs can include all or a portion of a computer program product which implements an embodiment of the present invention. Such a computer program product is graphically illustrated as computer program instructions 404, 406, 408 and 410, residing on media as described above representing various systems that make up the check processing environment. These systems include CIMS 412, recovery CIMS 414, TRX warehouse 416, and CPCS 418.

Still referring to FIG. 4, mainframe system 402 can include connectivity to network 420 to send files to a clearing house or the Federal Reserve ("Fed") 422. Network 420 can also be used to retrieve images from archive 424 when necessary. Network 420 can be can be an intranet, virtual private network (VPN) connection, local area network (LAN) connection, or any other type of network connection as well as the Internet. In most cases information traversing this network would be encrypted so that a "secure pipe" is formed between computer system 402 and other systems with which it exchanges data. Check processing environment 400 and mainframe computer 402 are also connected to accounting systems 426, so that appropriate ledger entries may be made to account for the cash letter activities described herein. Such a connection can be made in various ways, but would typically be an internal network such as a LAN.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, action, or portion of code, which comprises one or more executable instructions or actions for implementing the specified logical function(s). It should also be noted that, in some alternative implementations, the functions noted described herein may occur out of the order presented, depending upon the functionality involved. It will also be noted that each block of the block diagrams and/or flowchart illustrations, and combinations of blocks in the block diagrams and/or flowchart illustrations, can be implemented by special purpose hardware-based systems or operators which perform the specified functions or acts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "above", "below", "less", "greater", are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of re-creating a cash letter from otherwise stored information regarding each item of a plurality of items represented in the cash letter, the method comprising:
   identifying the plurality of items represented in the cash letter;
   creating a file corresponding to a data set describing the plurality of items;
   storing images corresponding to the plurality of items within a check image management system (CIMS);
   storing images corresponding to the plurality of items within a separate recovery CIMS:
   reformatting, using a processor, the file corresponding to the data set using the images stored on the recovery CIMS to create a recovery cash letter, wherein the cash letter was previously created and warrants re-creation; and
   presenting the recovery cash letter with at least one of an image or an image replacement document (IRD) for each item of the plurality of items in the recovery CIMS.

2. The method of claim 1 wherein the file corresponding to the data set is an input creation (ICRE) file.

3. The method of claim 1 further comprising:
   printing an IRD for each item of the plurality of items in the recovery CIMS; and
   recapturing the IRD for each item of the plurality of items in the recovery CIMS.

4. The method of claim 2 further comprising retrieving at least some of the images corresponding to the plurality of items from an archive.

5. The method of claim 4 further comprising:
   printing an IRD for each item of the plurality of items in the recovery CIMS; and
   recapturing the IRD for each item of the plurality of items in the recovery CIMS.

6. An apparatus for re-creating a cash letter from otherwise stored information regarding each item of a plurality of items represented in the cash letter, the apparatus comprising:
   means for creating a file corresponding to a data set describing the plurality of items;
   means for storing images corresponding to the plurality of items within a check image management system (CIMS);
   means for storing images corresponding to the plurality of items within a separate recovery CIMS;
   means for reformatting the file corresponding to the data set using the images stored on the recovery CIMS to create a recovery cash letter, wherein the cash letter was previously created and warrants re-creation; and
   means for presenting the recovery cash letter with at least one of an image and an image replacement document (IRD) for each item of the plurality of items in the recovery CIMS.

7. The apparatus of claim 6 further comprising:
   means for printing an IRD for each item of the plurality of items in the recovery CIMS; and
   means for recapturing the IRD for each item of the plurality of items in the recovery CIMS.

8. The apparatus of claim 6 further comprising means for retrieving at least some of the images corresponding to the plurality of items from an archive.

9. The apparatus of claim 7 further comprising means for retrieving at least some of the images corresponding to the plurality of items from an archive.

10. A non-transitory computer-readable medium including computer program code for re-creating a cash letter from otherwise stored information regarding each item of a plurality of items represented in the cash letter, the computer program code comprising:
    instructions for creating a file corresponding to a data set describing the plurality of items;
    instructions for storing images corresponding to the plurality of items within a check image management system (CIMS);
    instructions for storing images corresponding to the plurality of items within a separate recovery CIMS;
    instructions for reformatting the file corresponding to the data set using the images stored on the recovery CIMS to create a recovery cash letter, wherein the cash letter was previously created and warrants re-creation; and
    instructions for presenting the recovery cash letter with at least one of an image and an image replacement document (IRD) for each item of the plurality of items in the recovery CIMS.

11. The computer program code of claim 10 wherein the file corresponding to the data set is an input creation (ICRE) file.

12. The computer program code of claim 10 further comprising:
    instructions for printing an IRD for each item of the plurality of items in the recovery CIMS; and
    instructions for recapturing the IRD for each item of the plurality of items in the recovery CIMS.

13. The computer program code of claim 11 further comprising instructions for retrieving at least some of the images corresponding to the plurality of items from an archive.

14. The computer program code of claim 13 further comprising:
    instructions for printing an IRD for each item of the plurality of items in the recovery CIMS; and
    instructions for recapturing the IRD for each item of the plurality of items in the recovery CIMS.

15. A system for re-creating a cash letter from otherwise stored information regarding each item of a plurality of items represented in the cash letter, the system comprising:
    a check processing control system (CPCS) to enable identifying the plurality of items represented in the cash letter and to create a file corresponding to a data set describing the plurality of items;
    at least one day-to-day check image management system (CIMS) to store images corresponding to the plurality of items;
    at least one recovery CIMS for use in recovery operations to store images corresponding to the plurality of items; and
    a reformatter functionally connected to the CPCS and the CIMS to reformat the file corresponding to the data set using the images stored on the recovery CIMS to create a recovery cash letter, wherein the cash letter was previously created and warrants re-creation.

16. The system of claim 15 wherein the at least one CIMS comprises a recovery CIMS.

17. The system of claim 16 further comprising a transaction exchange (TRX) warehouse to manage presenting the recovery cash letter with at least one of an image and an image replacement document (IRD) for each item of the plurality of items.

18. The system of claim 15 further comprising a network connection for accessing a storage archive.

19. The system of claim 15 further comprising a transaction exchange (TRX) warehouse to manage presenting the cash letter with at least one of an image and an image replacement document (IRD) for each item of the plurality of items.

* * * * *